(12) United States Patent
DeVreese et al.

(10) Patent No.: US 10,034,033 B2
(45) Date of Patent: Jul. 24, 2018

(54) PREDICTIVE MEDIA DISTRIBUTION SYSTEM

(71) Applicant: Cisco Technology, Inc., San Jose, CA (US)

(72) Inventors: Tim DeVreese, Destelbergen (BE); Qi Wang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/221,825

(22) Filed: Jul. 28, 2016

(65) Prior Publication Data
US 2018/0035147 A1    Feb. 1, 2018

(51) Int. Cl.
| | |
|---|---|
| *H04N 7/173* | (2011.01) |
| *H04N 21/2662* | (2011.01) |
| *H04N 21/2343* | (2011.01) |
| *H04L 29/06* | (2006.01) |
| *H04N 21/24* | (2011.01) |
| *H04N 21/236* | (2011.01) |

(52) U.S. Cl.
CPC ....... *H04N 21/2662* (2013.01); *H04L 65/602* (2013.01); *H04L 65/607* (2013.01); *H04N 21/236* (2013.01); *H04N 21/2343* (2013.01); *H04N 21/2402* (2013.01)

(58) Field of Classification Search
CPC ............. H04N 21/2662; H04N 21/236; H04N 21/2402; H04N 21/2343
USPC ......................................................... 725/116
See application file for complete search history.

(56) References Cited

U.S. PATENT DOCUMENTS

| | | | |
|---|---|---|---|
| 9,332,048 B2 * | 5/2016 | Johansson ............... | H04L 65/60 |
| 9,615,126 B2 * | 4/2017 | Ramamurthy ..... | H04N 21/4331 |
| 2011/0191446 A1 * | 8/2011 | Dazzi ...................... | G06F 15/16 |
| | | | 709/219 |
| 2011/0246885 A1 * | 10/2011 | Pantos ................ | H04L 65/4084 |
| | | | 715/716 |
| 2015/0172340 A1 * | 6/2015 | Lohmar ............. | H04N 21/2401 |
| | | | 709/219 |

* cited by examiner

*Primary Examiner* — Michael B Pierorazio
(74) *Attorney, Agent, or Firm* — Ronald Fernando

(57) ABSTRACT

A disclosed method is performed at a system configured to distribute segment instances corresponding to segments of a media item. The method includes receiving, from a client device, a first segment request including data indicative of a first set of segments of the media item and data indicative of a first bitrate. The method further includes transmitting, to the client device in response to the first segment request, a first set of segment instances, each of the first set of segment instances including data encoding a respective one of the first set of segments at the first bitrate. The method includes generating, in response to the first segment request, a first prediction indicative of a first predicted set of segment instances, each of the first predicted set of segment instances including data encoding a segment of the media item subsequent to the first set of segments at one of a plurality of predicted bitrates.

20 Claims, 13 Drawing Sheets

FIG. 3

PREDICTIVE MEDIA DISTRIBUTION SYSTEM

TECHNICAL FIELD

The present disclosure relates generally to media distribution systems, and, in particular, to enabling more efficient storage of archived multimedia information for distribution.

BACKGROUND

Modern computing often involves prompt and reliable storage of information. Data archival can an expensive practice regardless of the type of information being stored. However, this is particularly true when archiving media items with adaptive bitrate (ABR) video streaming. One consideration with data archival in an ABR video streaming environment is to ensure a client device quickly receives segments of a media item with a specific, requested bitrate. For example, a smart phone can make requests for segments of a media item with a different bitrate than that requested by a set-top box. In some situations, a media item is not stored at a requested bitrate, and segments of the media item must be synthesized with the requested bitrate to fulfill a client request. Another consideration with data archival in an ABR video streaming environment is that storage of a media item encoded with multiple bitrates may result in a large waste of storage space, particularly if segments encoded at several of the bitrates are rarely requested.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

FIG. 3 shows a segment instance frequency matrix in accordance with some implementations.

Figure 1A:
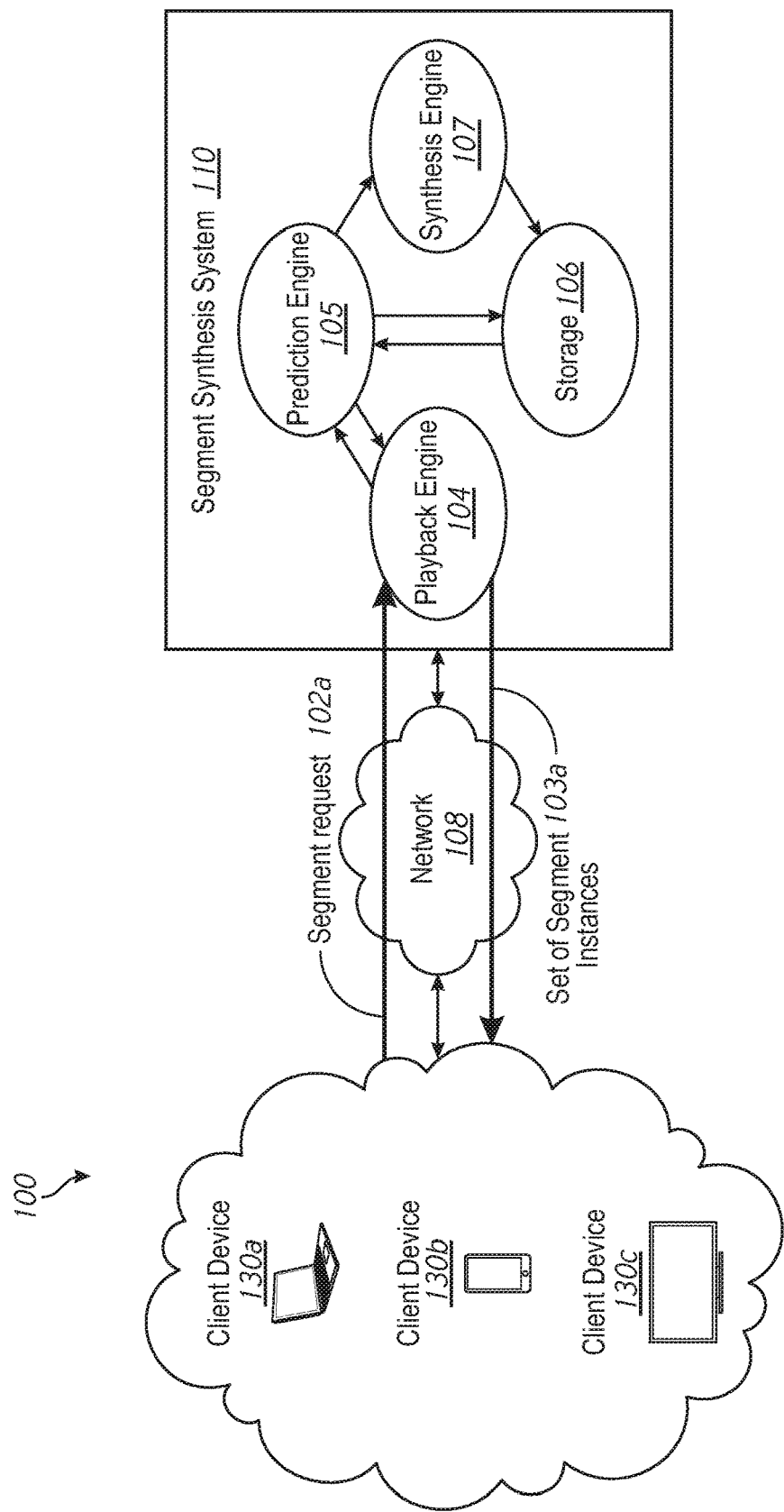
FIG. 1A is a block diagram representation of media distribution environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for distributing segments of a media item. For example, in some implementations, a method is performed at a system configured to synthesize segment instances corresponding to segments of a media item including a series of segments. The system includes a non-transitory memory and one or more processors. The method includes receiving, from a client device, a first segment request including data including of a first set of segments of the media item and data indicative of a first bitrate. The method further includes transmitting, to the client device in response to the first segment request, a first set of segment instances. Each of the first set of segment instances includes data encoding a respective one of the first set of segments at the first bitrate. The method further includes generating, in response to the first segment request, a first prediction indicative of a first predicted set of segment instances. Each of the first predicted set of segment instances includes data encoding a segment of the media item subsequent to the first set of segments at one of a plurality of predicted bitrates.

Example Embodiments

FIG. 1A is a block diagram of a media distribution environment 100 in accordance with some implementations. While certain specific features are illustrated, those of ordinary skill in the art will appreciate from the present disclosure that various other features have not been illustrated for the sake of brevity and so as not to obscure more pertinent aspects of the example implementations disclosed herein. To that end, in some implementations, the media distribution environment 100 includes a number of client devices, including a first client device 130a (e.g., a laptop), a second client device 130b (e.g., a smart phone), and a third client device 130c (e.g., a television). In some implementations, the media distribution environment 100 can include other client devices that are not shown in FIG. 1A, such as tablets, computers, set-top boxes, video game consoles, and any other electronic devices configured to obtain and convey audiovisual media information.

The client devices 130a-130c are connected to a segment synthesis system 110 via a network 108. The network 108 can include a private network or a public network, such as the internet. In some implementations, the segment synthesis system 100 is configured to store audiovisual data associated with multicast (e.g., broadcast) content and, thus, operates as a digital video recorder (DVR). In some implementations, and as described further below, the segment synthesis system 110 provides audiovisual data associated with the multicast content via the network 108 in response to requests. Thus, in some implementations, the segment synthesis system 110 operates as a cloud-based DVR. In some implementations, the segment synthesis system 100 is configured to store audiovisual data associated with unicast content and, thus, operates as a video on-demand (VOD) server.

The segment synthesis system 110 includes storage 106 that stores data associated with media items (e.g., audiovisual content). A media item can be partitioned into a series of segments. A segment can correspond to, for example, approximately 2 second or approximately 10 seconds of the media item. The storage 106 can store a plurality of segment instances for a media item, where each segment instance is a data structure that includes data encoding a particular segment of the media item at a particular bitrate. A segment instance can include additional data, such as a header with metadata indicating the segment of the media item and/or the bitrate.

In various implementations, the storage 106 is a portion of cache memory or a portion of long-term non-volatile memory. While FIG. 1A illustrates the storage 106 as a part of the segment synthesis system 110, in various implementations, the storage 106 can be external to the segment synthesis system 110.

The segment synthesis system 110 includes a synthesis engine 107 that synthesizes segment instances. In various implementations, the synthesis engine 107 receives a request to synthesize a segment instance, the request including data identifying the segment (e.g., a media item identifier and a segment identifier) and data specifying a bitrate. In response, the synthesis engine 107 synthesizes a segment instance including data encoding the segment at the bitrate. In various implementations, the synthesis engine 107 is capable of synthesizing a segment instance encoded at any one of a plurality of supported bitrates. The plurality of supported bitrates can range from a highest supported bitrate to a lowest supported bitrate. In various implementations, the supported bitrates include 400 kbit/s, 1 Mbit/s, 3.8 Mbit/s, 5 Mbit/s, 10 Mbit/s, 12 Mbit/s and 15 Mbit/s. The synthesis engine 107 can synthesize the segment instance by retrieving a first segment instance including data encoding the segment at a first bitrate (e.g., from the storage 106) and down-converting the first segment instance to generate a second segment instance including data encoding the segment at a second bitrate less than the first bitrate.

The segment synthesis system 110 includes a playback engine 104 that receives segment requests, e.g., from the client devices 103a-103c, and responds to the segment requests by providing segment instances corresponding to the segment requests. A segment request can include data identifying a segment (or a set of segments) and data specifying a bitrate. In response to such a segment request, the playback engine 104 provides a segment instance (or a set of segment instances) including data encoding the segment (or set of segments) at the bitrate.

The segment synthesis system 110 includes a prediction engine 105 that, in response to a segment request, generates a prediction indicative of the substance of a next segment request. For example, in response to a first segment request for a first segment encoded at a first bitrate, the prediction engine 105 can generate a prediction based on the presumption that a second segment request that may be later received will request a second segment encoded at the first bitrate, a slightly higher bitrate, or a slightly lower bitrate.

Thus, in various implementations, a client device transmits a first segment request 102a to the segment synthesis system 110 (or to the playback engine 104 thereof) requesting a first set of segments of a media item. In various implementations, the first set of segments can include the first segment of the media item. In various implementations, the first set of segments can include one segment or more than one segment. In a particular implementation, the first set of segments includes the first two segments of the media item. In particular, the segment request 102a includes data indicative of the first set of segments of the media item. The data indicative of the first set of segments can include, for example, a media item identifier, segment identifiers for each of the first set of segments, a time window, or one or more presentation timestamps (PTS). The first segment request 102a also includes data indicative of a first bitrate. The data indicative of the first bitrate can include, for example, the bitrate itself (e.g., a number) or a bitrate identifier (e.g., an identifier associated with one of the supported bitrates). The first segment request 102a can include additional information, such as a screen resolution of the client device or a type of the client device. For example, if the first segment request 102a is transmitted by the first client device 130a, the first segment request 102a can indicate that the first client device 130a is a laptop, whereas if the first segment request 102a is transmitted by the second client device 130b, the first segment request 102a can indicate that the second client device 130b is a smartphone.

In response to receiving the first segment request 102a, the segment synthesis system 110 transmits, to the client device, a first set of segment instances 103a, each of the first set of segment instances including data encoding a respective one of the first set of segments at the first bitrate (e.g., the bitrate indicating in the first segment request 102a).

In some implementations, a client device transmits several segment requests in succession to retrieve a desired portion of a media item, up to and including the entire media item. In some implementations, the first segment request 102a corresponds to a first number of segments of a media item (e.g., two segments), while subsequent segment requests correspond to a second number of segments of the media item (e.g., one segment). In various implementations, the first number of segments can be the same or different from the second number of segments. For example, the second number of segments can be less than the first number of segments. In various implementations, the first number of segments can be, as described further below, based on a latency threshold of the client device and the second number of segments can be fixed.

As an example, where each segment corresponds to one second of a media item, the client device 130a can send 1799 successive segment requests through the network 108 to the playback engine 104 to obtain 1799 corresponding sets of segment instances corresponding to thirty minutes of a cartoon program, where the first segment request requests two segments and each subsequent request requests a single segment.

As also described above, the segment synthesis system 110 includes several components or modules, including the playback engine 104, the prediction engine 105, the storage 106, and the synthesis engine 107. In some implementations, the playback engine 104 of the segment synthesis system 110 acts as an interface for the segment synthesis system 110 by receiving segment requests and transmitting sets of segment instances corresponding to the segments indicative by the segment requests.

In some implementations, the prediction engine 105 of the segment synthesis system 110 generates, in response to a first segment request, a prediction predictive of the substance of a next segment request. Thus, the prediction specifies a set of predicted segment instances that are likely to be requested in the next segment request. Each of the set of predicted segment instances includes data encoding a segment of the media item subsequent to the segments indicated by the first segment request at one of a plurality of predicted bitrates. The prediction does not, itself, include the set of predicted segments, but rather is indicative of predicted segment instances that are likely to be requested. Thus, the prediction can be implemented as a data structure that stores, for each of the predicted segment instances, an associated pair of data indicative of a segment and data indicative of a bit rate. In various implementations, the prediction engine 105 generates the prediction while the playback engine 104 is transmitting a first set of segments instances corresponding to segments of a first segment request.

As described above, the synthesis engine 107 of the segment synthesis system 110 synthesizes segment instances (at a particular bitrate) corresponding to segments of a media item. As described further below, the synthesis engine can synthesize one or more segment instances indicated by a prediction from the prediction engine 105. In some implementations, the segment synthesis system 110 stores, for a particular media item, a set of base segment instances encoding all the segments of the media item at the highest supported bitrate. Thus, in response to receiving one or more segment requests for segments the particular media item encoded at a lower, requested bitrate, the synthesis engine 107 synthesizes, transcodes or translates the base segment instances into segment instances at the requested bitrate.

Figure 1B:
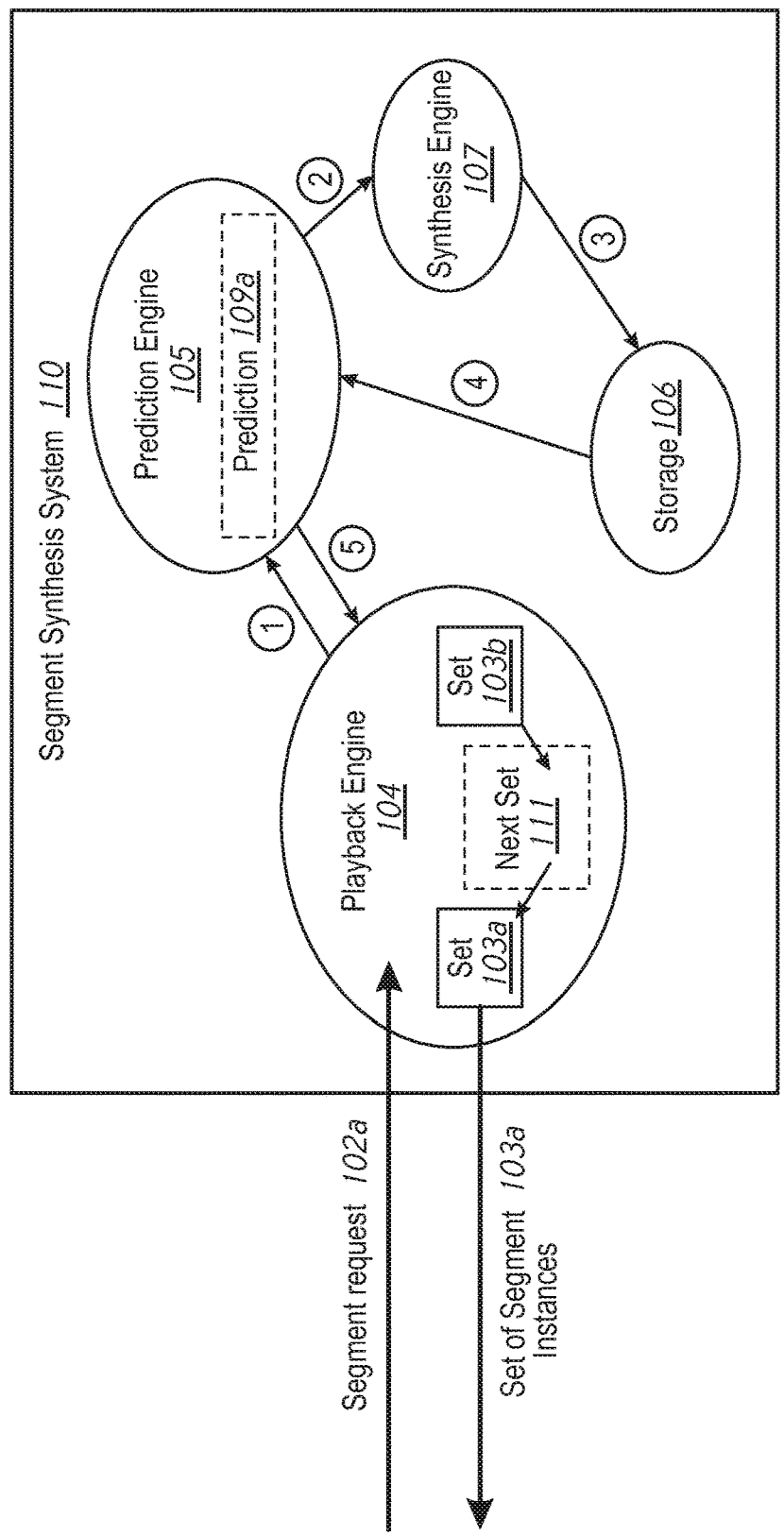
FIG. 1B is a block diagram representation of a segment synthesis system illustrating a first process flow in accordance with some implementations.

FIG. 1B is a block diagram of the segment synthesis system 110 illustrating a first process flow in accordance with some implementations. FIG. 1B illustrates an example sequence of operations within the segment synthesis system 110 for generating a first prediction 109*a* and synthesizing a first predicted set of segment instances 103*b*. As shown in FIG. 1B, the playback engine 104 receives a first segment request 102*a*. As noted above, the first segment request 102*a* includes data indicative of a first set of segments of a media item and data indicative of a first bitrate.

In response to receiving the segment request 102*a*, the playback engine 104 transmits a first set of segment instances 103*a* to the client device that sent the first segment request 102*a*. Each of the first set of segment instances 103*a* includes data encoding a respective one of the first set of segments at the first bitrate. In some implementations, a first number of segments of a particular media item (e.g., the first two segments) are stored in the storage 106 as a corresponding first number of segment instances encoded at each of a plurality of supported bitrates. For example, the storage 106 can store the first two segments of a news program as two segment instances encoded at bitrates of 400 kbit/s, 1 Mbit/s, 3.8 Mbit/s, 5 Mbit/s, 12 Mbit/s and 15 Mbit/s. The storage 106 can further store subsequent segments as segment instances at the highest support bitrate of 15 Mbit/s. In some implementations, in response to receiving the first segment request 102*a* and before (or while) transmitting the first set of segment instances 103*a* to the client device, the playback engine 104 designates a second set of segments as a next set 111. In some implementations, the next set 111 is a pointer, label, or indicator within the playback engine 104 associated with a set of segments of a particular media item subsequent to the first set of segments.

As shown in FIG. 1B (and as indicated by the first arrow), in response to receiving the first segment request 102*a*, the playback engine 104 sends information regarding the first segment request 102*a* to the prediction engine 105. In response, the prediction engine 105 generates a first prediction 109*a*. The first prediction 109*a* is indicative of a first predicted set of segment instances, each encoding a segment of the media item subsequent to the first set of segments (e.g., one of the next set 111 of segments) at one of a plurality of predicted bit rates. The first predicted set of segment instances includes segment instances encoded at a plurality of predicted bitrates. The plurality of predicted bitrates can be based on the first bit rate. The plurality of predicted bitrates can include the first bitrate and a predicted bitrate that is different from the first bitrate. For example, the plurality of predicted bitrates can include the first bitrate, a next highest supported bitrate, and a next lowest supported bitrate. The plurality of predicted bitrates can be based on historical bitrate data for the client device or historical bitrate data for a plurality of client devices of a type of the client device. For example, the first segment request 102*a* can include data indicative of the first two segments of a news program and include data indicative of a first bitrate of 3.8 Mbit/s. Based on that information, the first prediction 109 generated by the prediction engine 105 can indicate a first predicted set of segment instances including the next segment (e.g., the third segment) of the news program encoded at bitrates of 1 Mbit/s, 3.8 Mbit/s or 5 Mbit/s.

In some implementations, the first predicted set of segment instances includes a plurality of segment subsets, each segment instance of the segment subset encoding the same segment at different bitrates. In some implementations, the first predicted set of segment instances includes a plurality of bitrate subsets, each segment instance of the bitrate subset encoding different segments at the same bitrate. In some implementations, the number of segment instances per segment in a segment subset is configurable. For example, in various implementations, the first prediction 109*a* can indicate three segment instances for a single segment or five segment instances for a single segment.

In some implementations, the prediction engine 105 determines if the segment instances of the first predicted set of segment instances are already in the storage 106. In some implementations the storage 106 includes cache memory and/or non-volatile memory. In some circumstances, less than all the segment instances of the first predicted set of segment instances are stored in the storage 106. In such circumstances, where one or more of the segment instances of the first predicted set of segment instances are not stored in the storage 106, information from the prediction 109*a* is sent to the synthesis engine 107 to generate all the segment instances of the first predicted set of segment instances, as represented by the second arrow. In some implementations, information from the prediction 109*a* is sent to the synthesis engine 107 to generate just the segment instances of the first predicted set of segment instances that are not found in the storage 106.

In some implementations, after generating one or more segment instances of the first predicted set of segment instances, the synthesis engine 107 stores the generated one or more segment instances in the storage 106, as represented by the third arrow, and the prediction engine 105 obtains the one or more segment instances of the first predicted set of segment instances from the storage 106, as represented by the fourth arrow. In some implementations, the prediction engine 105 obtains segment instances of the first predicted set of segment instances from the storage 106 and/or directly from the synthesis engine 107.

As shown in FIG. 1B, the first predicted set of segments is sent from the prediction engine 105 to the playback engine 104, as represented by the fifth arrow. Thus, the playback engine 104 can quickly retrieve a second set of segment instances contained within the first predicted set in response to a request for such a second set of segment instances. For example, in response to receiving a second segment request indicating a second set of segments and a second bitrate (included as one of the plurality of predicted bitrates), the playback engine can quickly transmit a second set of segment instances encoding the second set of segments at the second bitrate.

Figure 1C:
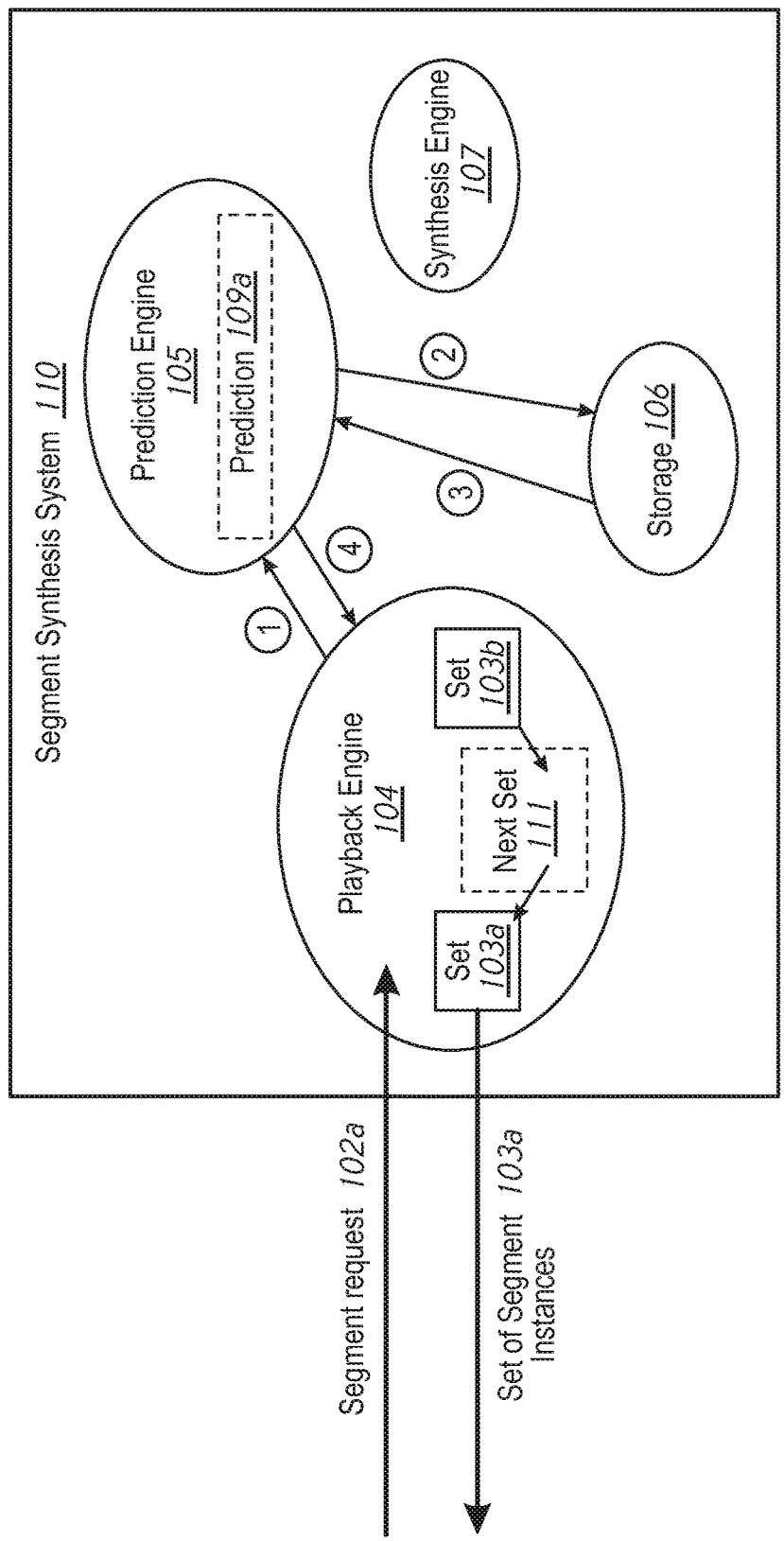
FIG. 1C is a block diagram representation of a segment synthesis system illustrating a second process flow in accordance with some implementations.

FIG. 1C is a block diagram of the segment synthesis system 110 illustrating a second process flow in accordance with some implementations. FIG. 1C illustrates a second example sequence of operations within segment synthesis system 110. The features of segment synthesis system 110 not described with respect to FIG. 1C are as described above with respect to FIG. 1B.

As described above with respect to FIG. 1B, in some implementations, the prediction engine 105 determines if the segment instances specified by the first prediction 109 are already in the storage 106. In some circumstances, all the segment instances of the first predicted set are stored in the storage 106. In such circumstances, the prediction engine 105 requests the first predicted set of segment instances from the storage 106, as represented by the second arrow, and receives the first predicted set of segment instances from the storage 106, as represented by the third arrow. As in the process flow of FIG. 1B, the first predicted set of segments is sent from the prediction engine 105 to the playback engine 104, as represented by the fourth arrow.

In some implementations, when all of the segment instances of the first predicted set are stored in the storage 106, the prediction engine 105 provides the location of the segments in the storage 106 to the playback engine 104. The playback engine 104 can retrieve the segments from the storage 106 and provide them to the requesting client.

While FIGS. 1A-1C illustrate four components 104, 105, 106 and 107 in the segment synthesis system 110, those of ordinary skill in the art will appreciate from the present disclosure that various other combinations of components, logical units, modules and computing engines have not been illustrated for the sake of brevity. Each of the depicted example engines and components 104, 105, 106 and 107 in the segment synthesis system 110 can be implemented on the same or separate computing devices.

Figure 2A:
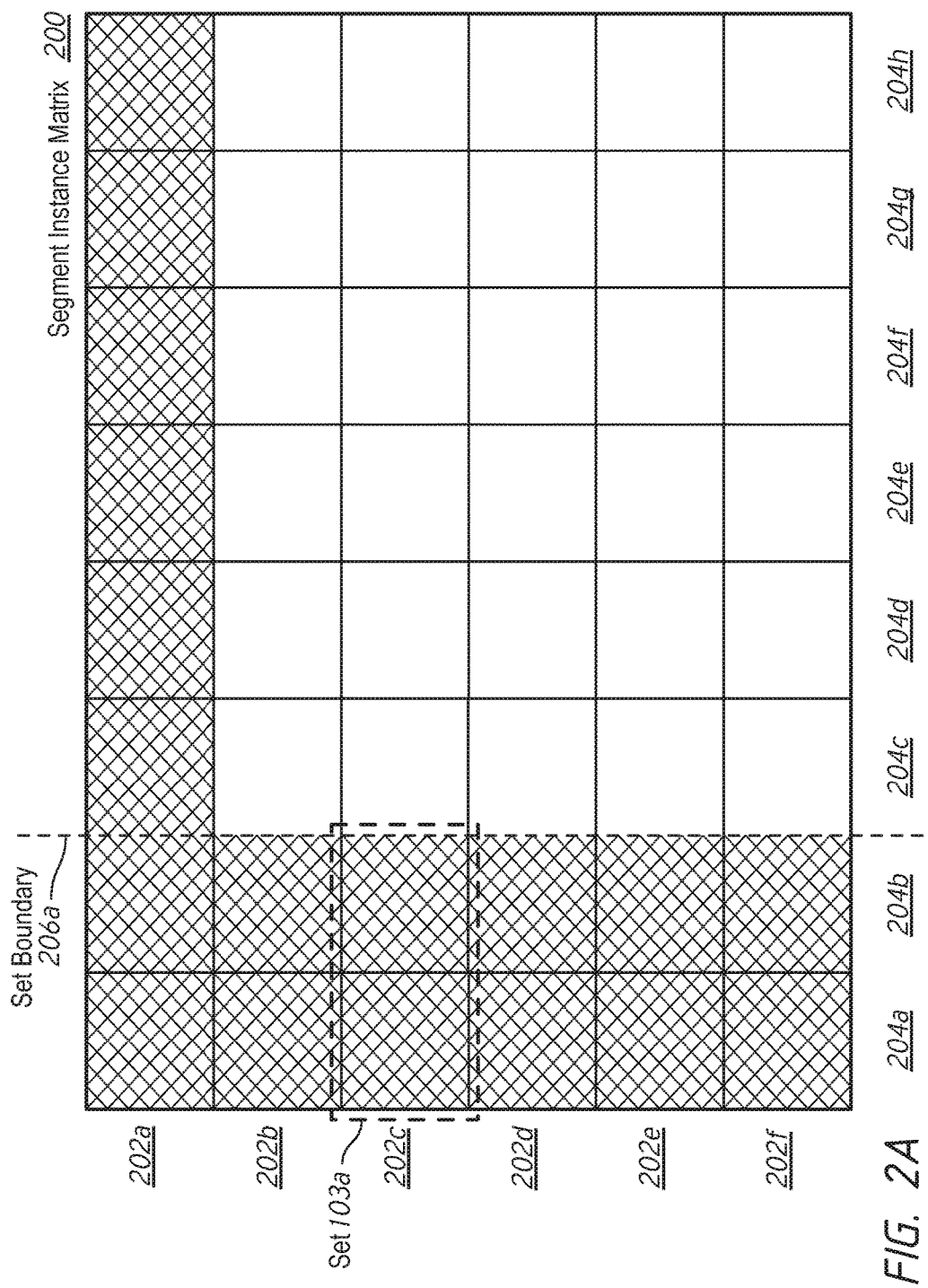
FIG. 2A shows a segment instance matrix at a first time in accordance with some implementations.

FIG. 2A shows a segment instance matrix 200 at a first time in accordance with some implementations. The segment instance matrix 200 is a graphical representation indicating stored segment instances (e.g., segment instances stored in the storage 106 of FIG. 1A) for a media item. Although illustrated as a matrix for ease of disclosure, information regarding which segment instances are stored can be represented (or stored as a data structure) in other ways.

The segment instance matrix 200 includes six rows 202a-202f corresponding to six supported bitrates and seven columns 204a-204h corresponding to a series of seven segments. It is to be appreciated that, in various implementations, a segment instance matrix can have other dimensions. Thus, each box of the segment instance matrix 200 corresponds to a segment instance encoding a particular segment at a particular bitrate. A shaded box indicates that a segment instance encoding the particular segment at the particular bitrate is stored. Conversely, an unshaded box instances that a segment instance encoding the particular segment at the particular bitrate is not stored.

In some implementations, the rows 202a-202f are ordered according to their corresponding supported bitrates. For example, in some implementations, row 202a corresponds to a highest supported bitrate, row 202b corresponds to a second highest supported bitrate, down to row 202f corresponding to a lowest supported bitrate. For example, the highest supported bitrate corresponding to row 202a can be 10 Mbits/s and the second highest supported bitrate corresponding to row 202b can be 5 Mbits/s. In some implementations, a first row of the segment instance matrix 200 corresponds to a particular type of electronic device and is associated with screen resolution information that differs from screen resolution information associated with a second row immediately above or below the first row in segment instance matrix 200. For example, row 202d can correspond to a screen resolution for a tablet while row 202c can correspond to a screen resolution for a television. In some implementations, the segment instance matrix 200 correspond to a single type of electronic device or resolution, such as a 1080p High-definition Television resolution, and another segment instance matrix corresponds to a different type of electronic device or resolution, for the same media item.

At the first time of FIG. 2A, various boxes of the segment instance matrix 200 are shaded, indicating that segment instances are stored encoding each of the segments of the particular media item at the first bitrate (e.g., each box of row 202a is shaded) and that segment instances are stored encoding the first two segments of the media item at each of the supported bitrates (e.g., each box of column 204a and 204b is shaded). Thus, in some implementations, the particular media item has every segment stored with the highest supported bitrate corresponding to row 202a, such that a segment synthesis system (e.g., the segment synthesis system 110 of FIG. 1A) can synthesize a segment instance of any lower supported bitrate by transcoding the corresponding segment instance represented in row 202a. Further, in some implementations, the first two segments of the particular media item are stored with every supported bitrate, such that a segment synthesis system (e.g., the segment synthesis system 110 of FIG. 1A) can quickly respond to a first segment request indicating the first two segments of the particular media item.

FIG. 2A illustrates a first set of segment instances 203a corresponding to a first set of segments (segments corresponding to columns 204a and 204b) encoded at a first bitrate (the bitrate corresponding to row 202c). The first set of segment instances 203a corresponds to a first segment request, as described above, including data indicative of the first set of segments and data indicative of the first bitrate. In some implementations, the size of the first set of segments instances 203a, marked by the set boundary 206a, depends on a latency threshold of the client device associated with the first segment request. In some implementations, the number of segments of the first set of segment instances 203a depends on the type of client device associated with the first segment request. For example, a playback buffer of a laptop computer may be large enough to store up to five segment instances of a media item at the highest supported bitrate of media item segment matrix 200. Thus, in various implementations, the first set of segment instances 203a can include up to five segment instances of the media item at the bitrate requested by the laptop computer, if the first five segment instances are already stored and available for transmission.

In some implementations, the size of the first set of segment instances 203a, marked by the set boundary 206a, depends on the first bitrate indicated by the first segment request. For example, all the supported bitrates of the segment instance matrix 200 can correspond to a smartphone with a playback buffer large enough to store up to three segment instances of a media item encoded at a bitrate corresponding to row 202f, two segments of the media item encoded at a bitrate corresponding to row 202c, and one segment of the media item encoded at a bitrate corresponding to 202a. In this example, the first set of segment instances 203a can include three segment instances if the first bitrate is the bitrate corresponding to row 202f, two segment instances if the first bitrate is the bitrate corresponding to row 202c, and one segment instance if the first bitrate is the bitrate corresponding to row 202a, if the segment instances are already stored and available for transmission to the smart phone.

Figure 2B:
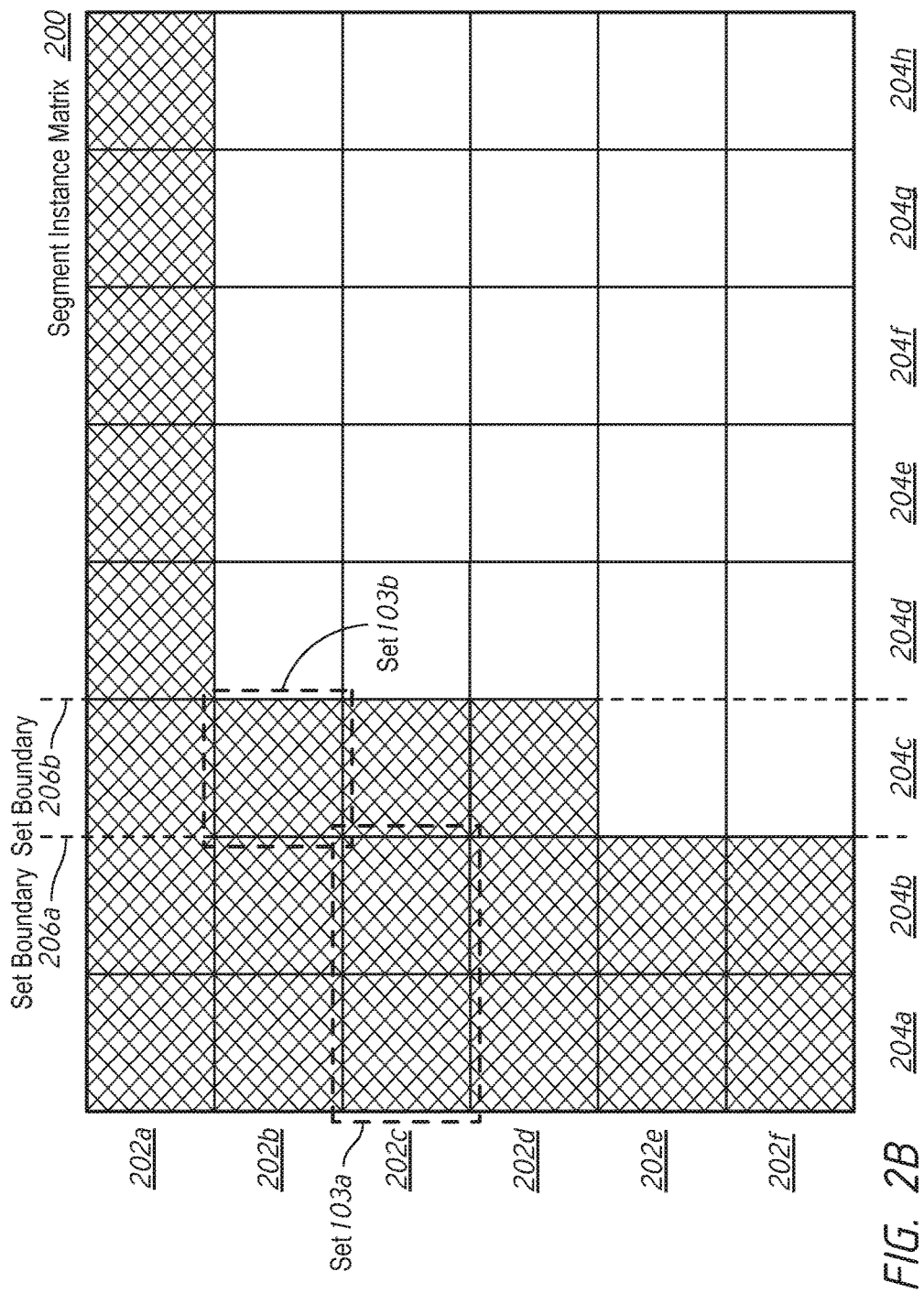
FIG. 2B shows the segment instance matrix of FIG. 2A at a second time in accordance with some implementations.

FIG. 2B shows the segment instance matrix 200 of FIG. 2A at a second time in accordance with some implementations. FIG. 2B illustrates storage of three additional segment instances encoding the segment corresponding to column 204c at bitrates corresponding to row 202b, row 202c and row 202d. The second time can correspond to a time after a first segment request for the first set of segment instances 203a and before a second segment request for a second set of segment instances 203b.

In response to the first segment request, a segment synthesis system generates a prediction indicative of a first predicted set of segment instances, each of the first predicted set of segment instances including data encoding a segment of the media item subsequent to the first set of segments at one of a plurality of predicted bitrates. The first prediction can indicate a next segment (corresponding to column 204c) encoded at the first bitrate (corresponding to row 202c), encoded at a next higher supported bitrate (corresponding to row 202b), and encoded at a next lower supported bitrate (corresponding to row 202d). Because these three segment instances were not stored (as indicated by the unshaded boxes in FIG. 2A), the segment synthesis system synthesizes the three segment instances and stores them in storage (as indicated by the shaded boxes of FIG. 2B).

Figure 2C:
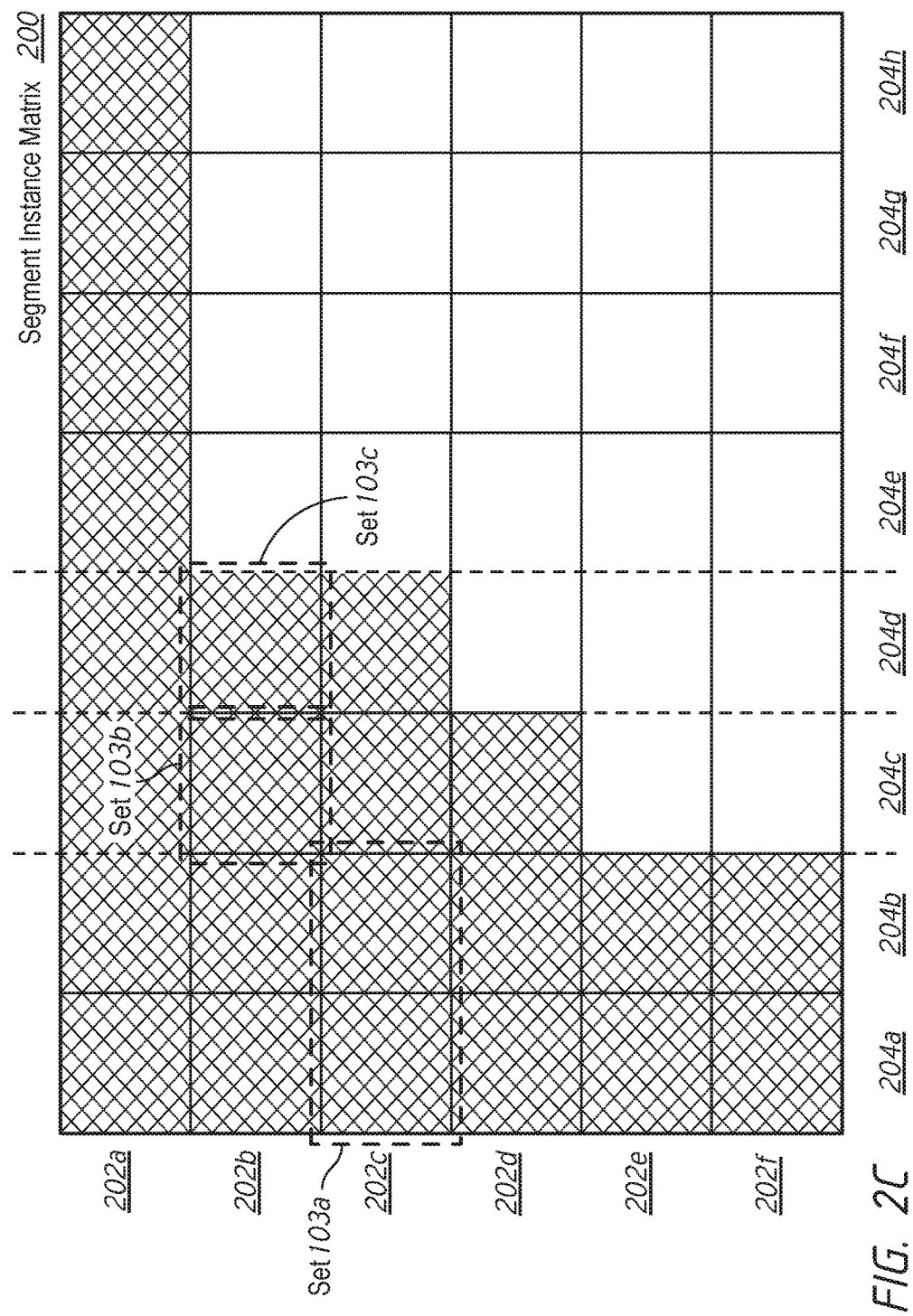
FIG. 2C shows the segment instance matrix of FIG. 2A at a third time in accordance with some implementations.

FIG. 2C shows the segment instance matrix 200 of FIG. 2A at a third time in accordance with some implementations. FIG. 2C illustrates storage of two additional segment instances encoding the segment corresponding to column 204d at bitrates corresponding to row 202b and row 202c. The third time can correspond to a time after a second segment request for the second set of segment instances 203b and before a third segment request for a third set of segments 203c.

In response to the second segment request, the segment synthesis system generates a second prediction indicative of a second predicted set of segment instances, each of the second predicted set of segment instances including data encoding a segment of the media item subsequent to the second set of segments at one of a plurality of predicted bitrates. The second prediction can indicate a next segment (corresponding to column 204d) encoded at the second bitrate (corresponding to row 202b), encoded at a next higher supported bitrate (corresponding to row 202a), and encoded at a next lower supported bitrate (corresponding to row 202c). Because the segment instance of the segment corresponding to column 204d at the highest supported bitrate corresponding to row 202a was already stored (as indicated by the shaded box of FIG. 2B), the segment synthesis system need not synthesize this segment instance. However, the segment synthesis system synthesizes the other segment instances and stores them in storage (as indicated by the shaded boxes of FIG. 2C).

Figure 2D:
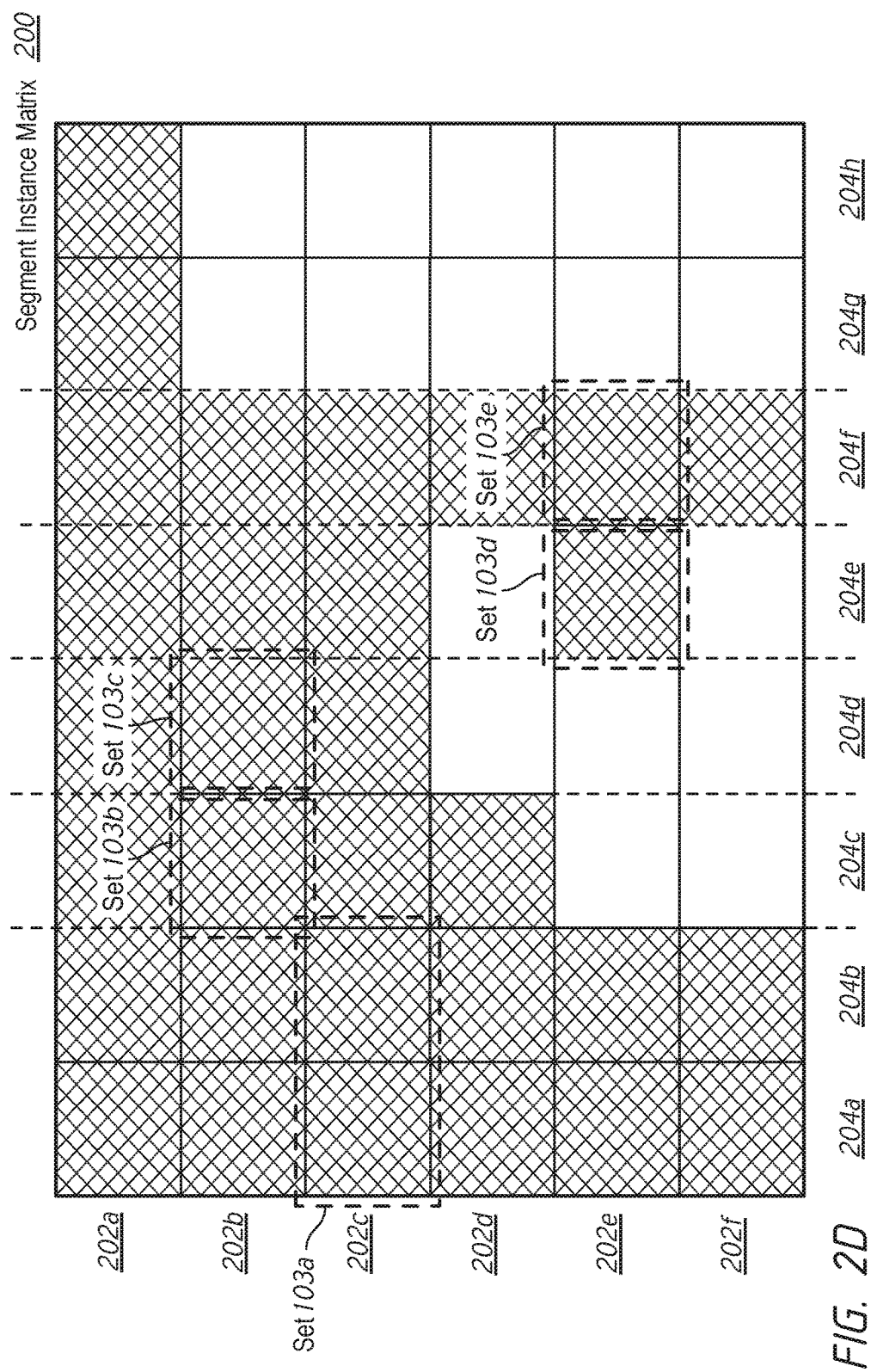
FIG. 2D shows the segment instance matrix of FIG. 2A at a fourth time in accordance with some implementations.

FIG. 2D shows the segment instance matrix 200 of FIG. 2A at a fourth time in accordance with some implementations. FIG. 2D illustrates storage of two additional segment instances encoding the segment corresponding to column 204e at bitrates corresponding to row 202b and row 202c. The third time can correspond to a time after the third segment request for the third set of segment instances 203c and a fourth segment request for a fourth set of segment instances 203d, but before a fifth segment request for a fifth set of segments 203e.

In response to the third segment request, the segment synthesis system generates a third prediction indicative of a third predicted set of segment instances, each of the third predicted set of segment instances including data encoding a segment of the media item subsequent to the third set of segments at one of a plurality of predicted bitrates. The third prediction can indicate a next segment (corresponding to column 204e) encoded at the second bitrate (corresponding to row 202b), encoded at a next higher supported bitrate (corresponding to row 202a), and encoded at a next lower supported bitrate (corresponding to row 202c). Because the segment instance of the segment corresponding to column 204d at the highest supported bitrate corresponding to row 202a was already stored (as indicated by the shaded box of FIG. 2C), the segment synthesis system need not synthesize this segment instance. However, the segment synthesis system synthesizes the other segment instances and stores them in storage (as indicated by the shaded boxes of FIG. 2D).

FIG. 2D also illustrates storage of six additional segment instances encoding the segment corresponding to column 204f at bitrates corresponding to all rows 202a-202f and an additional segment instance encoding the segment corresponding to column 204e at a bitrate corresponding to row 202e. In this example, the fourth segment request requests a segment instance not in the third predicted set of segment instances (e.g., the segment instance of set 203d). For example, in some implementations, a client device can experience network congestion and send a segment request for a particular media item with a lower bitrate than a bitrate requested immediately before experiencing the network congestion. As a result, an extra sequence of segment synthesis may be performed to generate segment instances of the requested set of segments at the requested bitrate.

Thus, in response to the fourth segment request, the segment synthesis system generates the segment instance indicated by the fourth segment request (set 203d) and generates a fourth prediction indicative of a fourth predicted set of segment instances, each of the fourth predicted set of segment instances including data encoding a segment of the media item subsequent to the fourth set of segments at one of a plurality of predicted bitrates. Because the fourth segment request requested a segment encoded at a bitrate that was not included in the third predicted set of segment instances, the plurality of predicted bitrates include all of the supported bitrates. In some implementations, segment instances encoded at all supported bitrates of one or more subsequent sets of segments are made available through generation or retrieval, in order to adapt to a potential irregularity in an otherwise stable pattern of predictable bitrates.

Figure 2E:
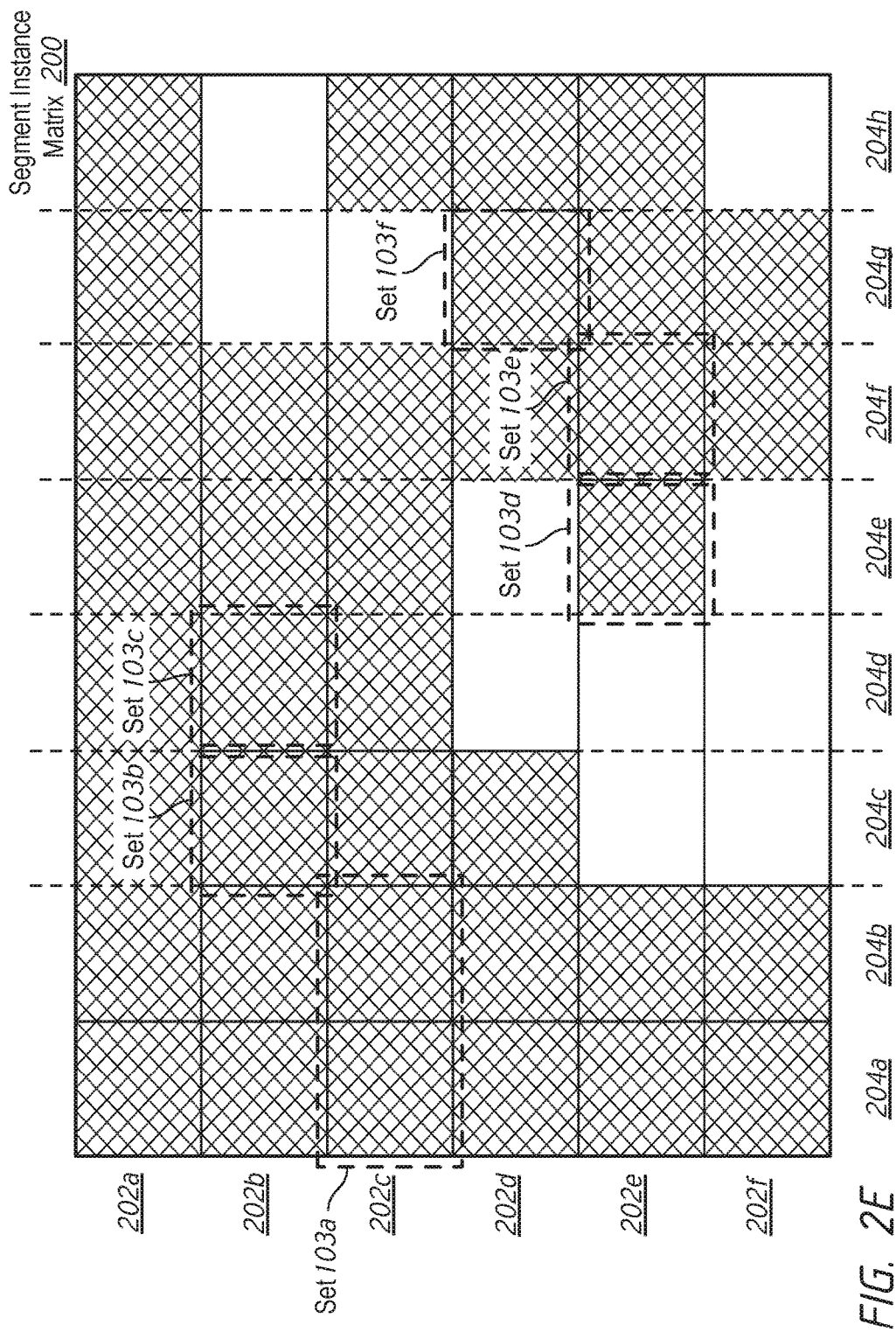
FIG. 2E shows the segment instance matrix of FIG. 2A at a fifth time in accordance with some implementations.

FIG. 2E shows the segment instance matrix 200 of FIG. 2A at a fifth time in accordance with some implementations. FIG. 2E illustrates storage of three additional segment instances encoding the segment corresponding to column 204g at bitrates corresponding to row 202d, row 202e, and row 202f. The fourth time can correspond to a time after the fifth segment request and after a sixth segment request.

In response to the fifth segment request (requesting the segment instance of set 203e), the segment synthesis system generates a fifth prediction indicative of a fifth predicted set of segment instances, each of the fifth predicted set of segment instances including data encoding a segment of the media item subsequent to the fourth set of segments at one of a plurality of predicted bitrates. The fifth prediction can indicate a next segment (corresponding to column 204g) encoded at the bitrate of the fifth request (corresponding to row 202e), encoded at a next higher supported bitrate (corresponding to row 202d), and encoded at a next lower supported bitrate (corresponding to row 202f). Because these segment instances are not storage (as indicated by the shaded boxes of FIG. 2D), the segment synthesis system synthesizes the segment instances and stores them in storage (as indicated by the shaded boxes of FIG. 2E).

FIG. 2E illustrates storage of three additional segment instances encoding the segment corresponding to column 204h at bitrates corresponding to row 202c, row 202d, and row 202e. In response to the fifth segment request (requesting the segment instance of set 203f), the segment synthesis system generates a sixth prediction indicative of a sixth predicted set of segment instances, each of the sixth predicted set of segment instances including data encoding a segment of the media item subsequent to the fifth set of segments at one of a plurality of predicted bitrates. The sixth prediction can indicate a next segment (corresponding to column 204h) encoded at the bitrate of the sixth request (corresponding to row 202d), encoded at a next higher supported bitrate (corresponding to row 202c), and encoded at a next lower supported bitrate (corresponding to row 202d). Because these segment instances are not storage (as indicated by the shaded boxes of FIG. 2D), the segment synthesis system synthesizes the segment instances and stores them in storage (as indicated by the shaded boxes of FIG. 2E).

Thus, FIG. 2E illustrates that in some implementations, a segment synthesis system reverts back to a default or previously configured specification of a prediction after determining that a predefined number of successive requested bitrates have the same value or are within a predefined range of bitrate values.

Figure 3:
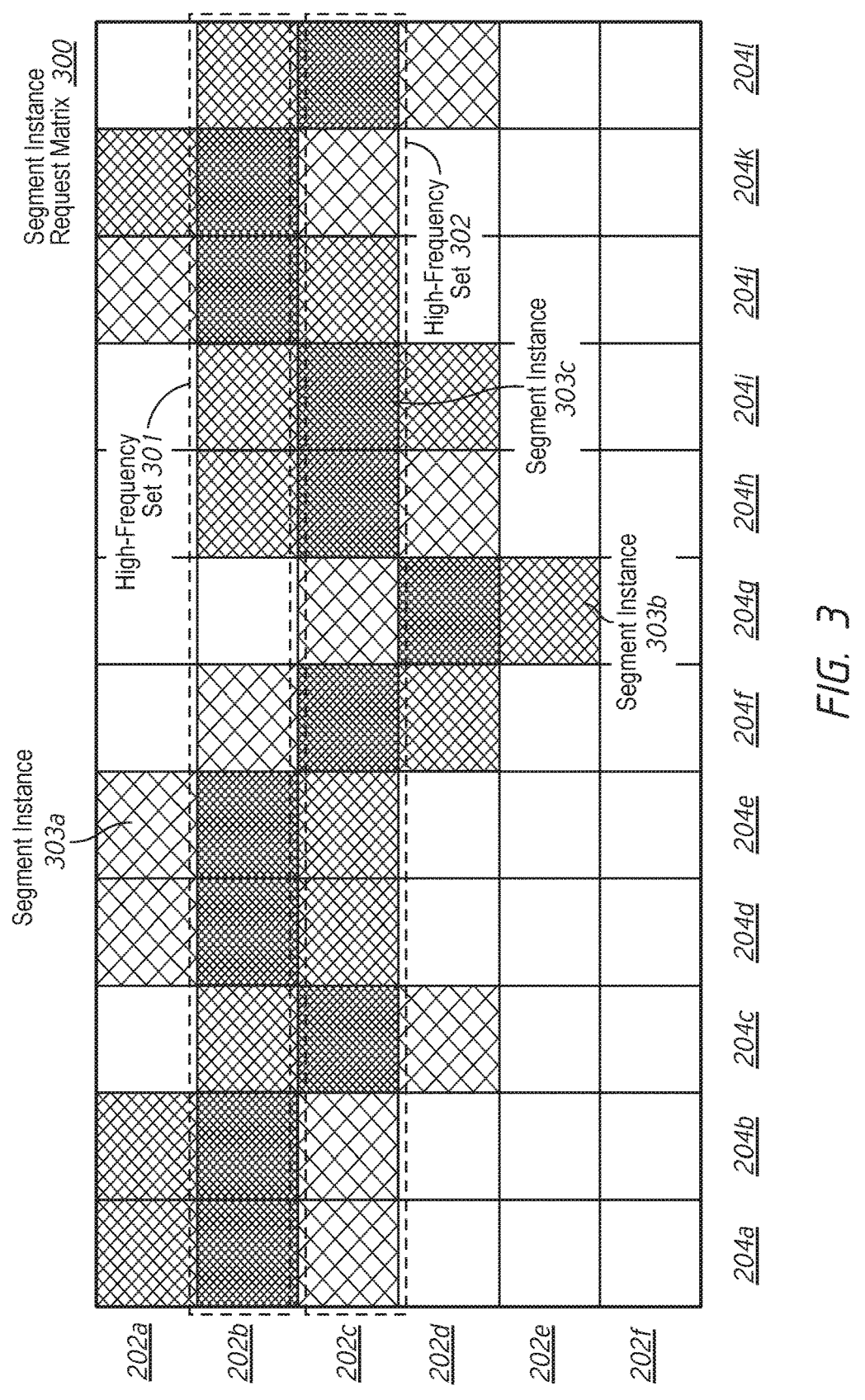

FIG. 3 is a segment instance request matrix 300 illustrating the frequency of segment instance requests over a period of time in accordance with some implementations. In some implementations, segment instance request matrix 300 corresponds to one particular media item. In some implementations, segment instance request matrix 300 corresponds to one screen resolution and/or type of client device.

The segment instance matrix 300 includes six rows 302a-302f corresponding to six supported bitrates and eleven columns 304a-304l corresponding to a series of eleven segments. It is to be appreciated that, in various implementations, a segment instance request matrix can have other dimensions. Thus, each box of the segment instance request matrix 300 corresponds to a segment instance encoding a particular segment at a particular bitrate. The shading of each box indicates a number of requests for the particular segment instance over a period of time (e.g., an hour, a day, a month, etc.). Although shown as shading in FIG. 3, the number of requests for the segment can be illustrated by other means (such as numbers within the box) and stored as a data structure in a variety of ways.

The segment instance request matrix 300 illustrates four request frequencies, a first request frequency illustrated by a lack of cross-hatching, a second request frequency illustrated by sparse cross-hatching (as in segment instance 303a), a third request frequency illustrated by moderate cross-hatching (as in segment instance 303b), and a fourth request frequency illustrated by dense cross-hatching (as in segment instance 303c). In various implementations, the four request frequencies are ordered from a lowest request frequency (e.g., a request frequency below a first threshold) to a highest request frequency (e.g., a request frequency above a second threshold). In some implementations, the request frequencies correspond to (1) less than 10,000 requests, (2) between 10,000 and 50,000 requests, (3) between 50,000 and 100,000 requests, and (4) more than 100,000 requests.

FIG. 3 also illustrates two examples of high-frequency sets, high-frequency set 311 and high-frequency set 312. In some implementations, a high-frequency set is a set of segment instances encoding segments at a particular bitrate. In some implementations, a high-frequency set of segment instances can be determined as the set of segment instances in a row having the greatest number of blocks indicating the highest request frequency. For example, in FIG. 3, row 302b includes 6 blocks indicating the highest request frequency, more than any other row. Thus, the set of segment instances associated with that row is designated as a high-frequency set (e.g., high-frequency set 311). In some implementations, a high-frequency set of segments can be determined as the set of segment instances in a row having the least number of blocks indicating the lowest request frequency. For example, in FIG. 3, row 302c includes 0 blocks indicating the lowest request frequency, less than any other row. Thus, the set of segment instances associated with that row is designated as a high-frequency set (e.g., high-frequency set 312.

In some implementations a high-frequency set only includes segment instances encoding segments at a single bitrate. In some implementations, a high-frequency set includes segment instances encoding segments at more than one bitrate. In some implementations, segment instances of a high-frequency set are synthesized and stored before a request for the segment instance is received. This technique allows for faster retrieval of requested segments encoded at requested bitrates for a majority of segment requests.

Figure 4:
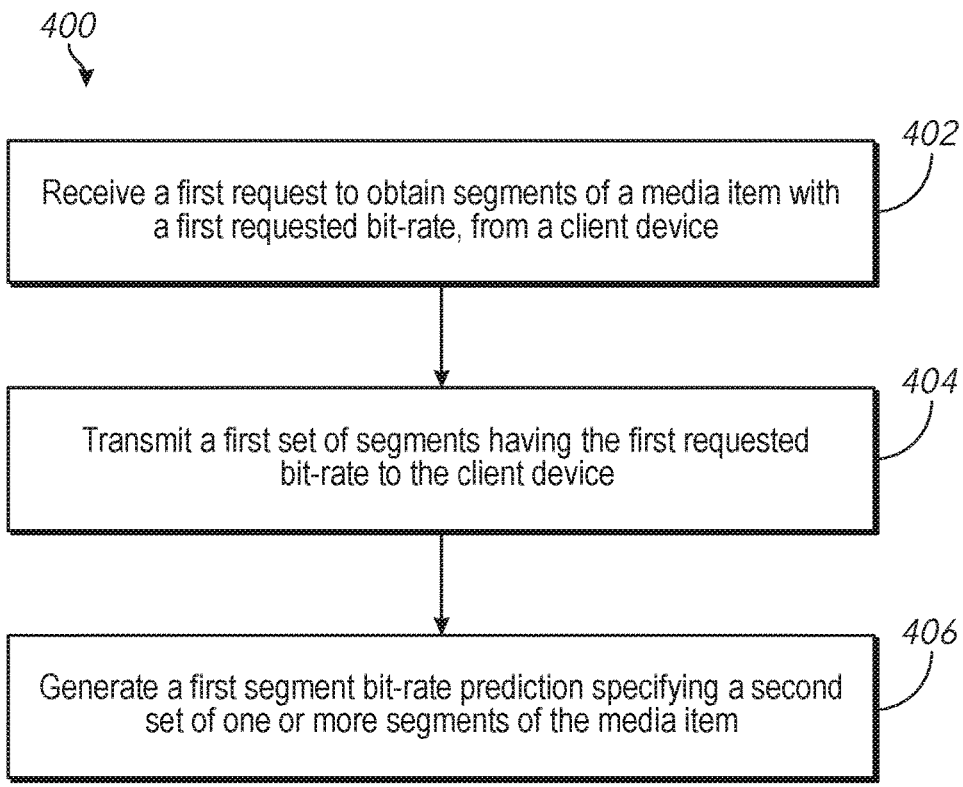
FIG. 4 is a flowchart representation of a method of generating a prediction in accordance with some implementations.

FIG. 4 is a flowchart representation of a method 400 of generating a prediction in accordance with some implementations. In some implementations and as detailed below as an example, the method 400 is performed by a segment synthesis system, such as the segment synthesis system 110 of FIGS. 1A-1C. In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, the method 400 includes receiving a segment request and, in response to the segment request, transmitting segment instances corresponding to the request and generating a prediction indicative of a predicted set of segment instances including segment instances likely to be requested in a subsequent segment request.

The method 400 begins, at block 402, with the segment synthesis system receiving, from a client device, a first segment request. The first segment request includes data indicative of a first set of segments of a media item and data indicative of a bitrate.

The method 400 continues, at block 404, with the segment synthesis system transmitting, to the client device in response to the first segment request, a first set of segment instances. Each of the first set of segment instances includes data encoding a respective one of the first set of segments at the first bitrate. Thus, in response to a segment request requesting a first set of segments encoded at a first bitrate, the segment synthesis system transmits a first set of segment instances including the first set of segments encoded at the first bitrate.

The method 400 continues, at block 406, with the segment synthesis system generating, in response to the first segment request, a first prediction indicative of a first predicted set of segment instances. Each of the first predicted set of segment instances includes data encoding a segment of the media item subsequent to the first set of segments at one of a plurality of predicted bit rate. Thus, the segment synthesis system, in response to a segment request for a set of segments encoded at a bitrate, transmits segment instances including the segments at the encoded bitrate (at block 404) and generates a prediction indicative of a set of segment instances likely to be requested in a subsequent segment request (at block 406). Although blocks 404 and 406 are illustrated in sequence, it is to be appreciated that the segment synthesis system can perform the operations of blocks 404 and 406 simultaneously or overlapping in time.

Figure 5A:
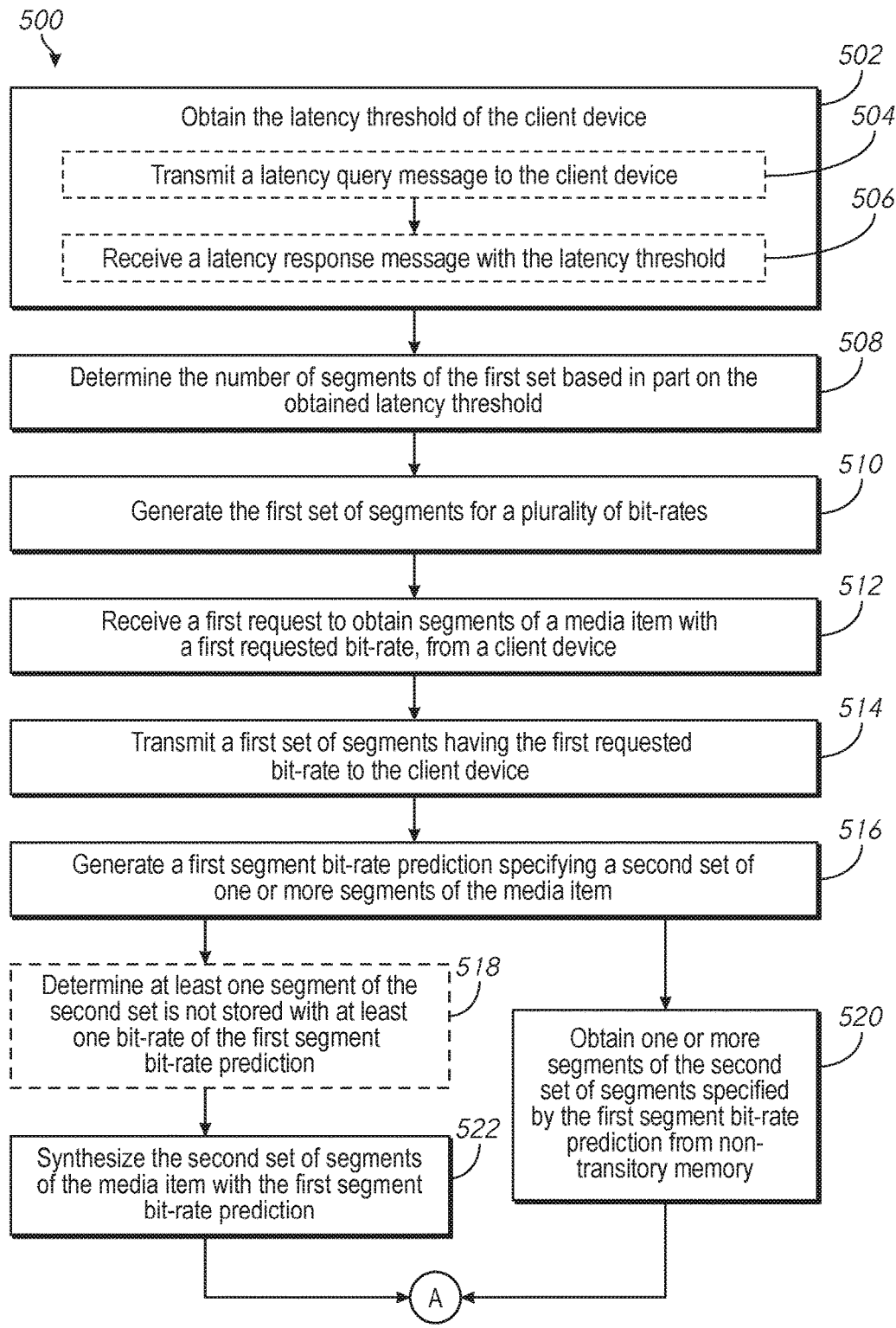
FIGS. 5A-5B are a flowchart representation of distributing segments of a media item in accordance with some implementations.
Figure 5B:
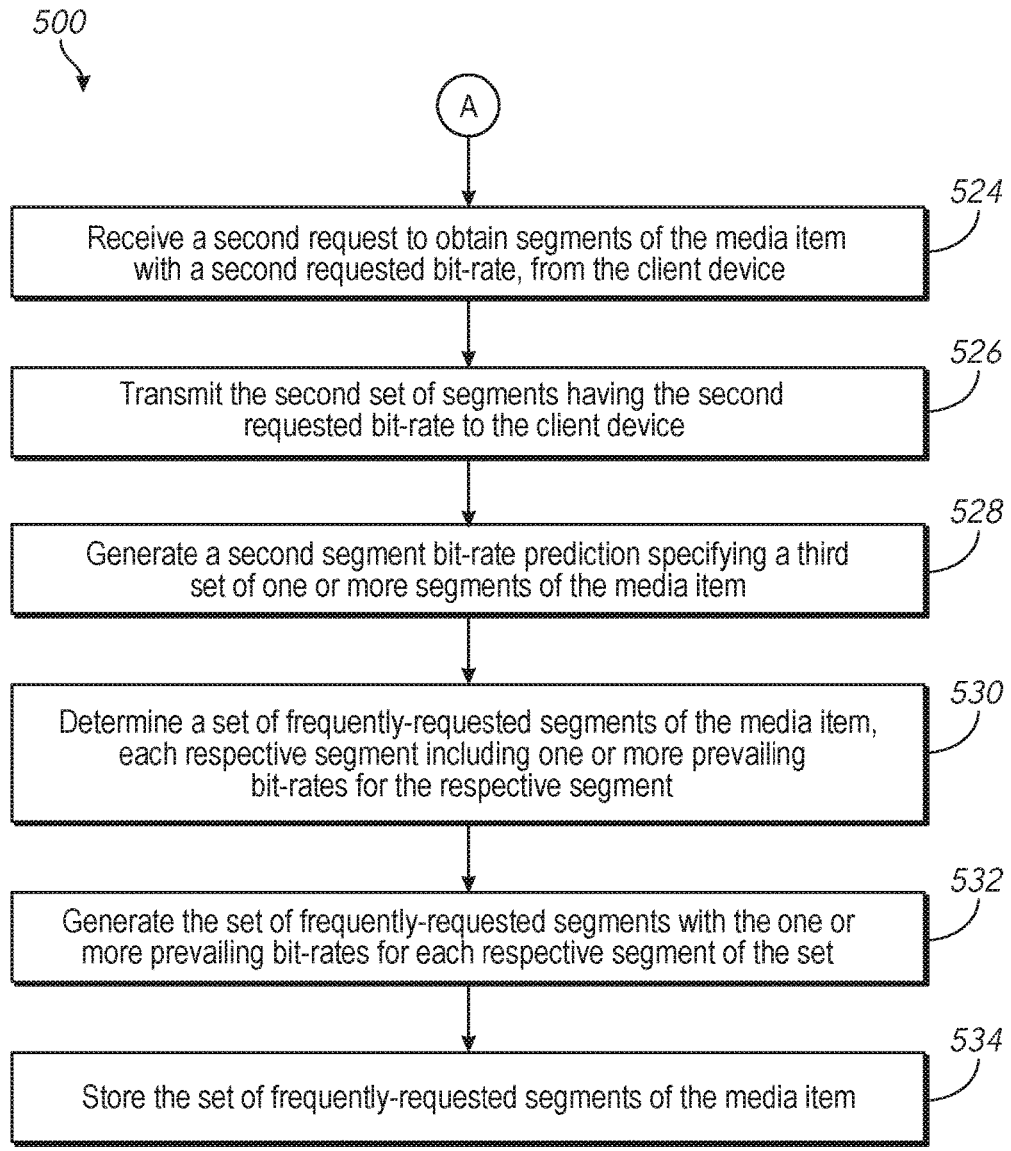

FIGS. 5A-5B are a flowchart representation of a method 500 of distributing segments of a media item in accordance with some implementations. In some implementations and as detailed below as an example, the method 500 is performed by a segment synthesis system, such as the segment synthesis system 110 of FIGS. 1A-1C. In some implementations, the method 500 is performed by processing logic, including hardware, firmware, software, or a combination thereof. In some implementations, the method 500 is performed by a processor executing code stored in a non-transitory computer-readable medium (e.g., a memory). In various implementations, the method 500 is a specific example of the method 400 of FIG. 4.

The method 500 begins, at block 502, with the segment synthesis system obtaining a latency threshold of a client device. In some implementations, the segment synthesis system obtains the latency threshold by transmitting a latency query message to the client device (as shown in block 504) and receiving a latency response message including data indicative of the latency threshold (as shown in block 506). In some implementations, the latency threshold of a client device is based on a playback buffer of the client device. In some implementations, the segment synthesis system obtains (in block 502) the latency threshold by estimating the latency threshold based on historical latency threshold values for the client device, current latency threshold values for other client devices (e.g., client devices of the same type), or predefined default latency threshold values for all client devices.

In some implementations, segment synthesis system obtains a performance threshold of a client device (of which the latency threshold is a particular example). The performance threshold can be based on download speed, ping time, number of retries, number of download aborts, failure data, or other network performance metrics.

The method 500 continues, at block 508, with the segment synthesis system determining a number of segments of a first set of segments of a media item based on the obtained latency threshold. For example, as described above with respect to FIG. 2A, the number of segments of the first set of segments can depend on one or more factors such as the playback buffer size of the client device and/or and the requested bitrate indicated by a first segment request.

The method 500 continues, at block 510, with the segment synthesis system synthesizing an initial set of segment instances. The initial set of segment instances includes a segment instance for each the first set of segment encoded at each of a plurality of supported bitrates (e.g., bitrates supported by the segment synthesis system). For example, as shown in FIG. 2A, a segment synthesis system synthesizes segment instances encoding the first two segments at each of the bitrates of the segment instance matrix 200. Although block 510 is illustrated subsequent to blocks 502 and 508, it is to be appreciated that the initial set of segment instances can be synthesized prior to obtaining the latency threshold of the client device. In general, it is to be appreciated that various operations of the blocks of the flowchart can be performed in other orders, simultaneously, or overlapping in time.

The method 500 continues, at block 512, with the segment synthesis system receiving, from the client device, a first segment request. The first segment request includes data indicative of a first set of segments of the media item and data indicative of a first bitrate.

The method 500 continues, at block 514, with the segment synthesis system transmitting, in response to first segment request, a first set of segment instances. Each of the first set of segment instances includes data encoding a respective one of the first set of segments at the first bitrate.

The method 500 continues, at block 516, with the segment synthesis system generating a first prediction. The first prediction is indicative of a first predicted set of segment instances. Each of the first predicted set of segment instances includes data encoding a segment of the media item subsequent to the first set of segments (e.g., the next segment or segments) at one of a plurality of predicted bitrates. In some implementations, the predicted bitrates include the first bitrate (of the first segment request) and a predicted bitrate that is different from the first bitrate. For example, the predicted bitrates can include the first bitrate, a next highest supported bitrate, and a next lowest predicted bitrate. Thus, the first predicted set of segments can include a particular segment (or segments) encoded at the first bitrate, the particular segment (or segments) encoded at a higher bitrate, and the particular segment (or segments) encoded at a lower bitrate. In various implementations, the plurality of predicted bitrates are based on at least one of the first bitrate, historical bitrate data for the client device, or historical bitrate data for a plurality of client devices of a type of the client device.

The number of the plurality of predicted bitrates can be configurable. In some implementations, the number of the plurality of predicted bitrates is based on historical bitrate data for the client device or historical bitrate data for a plurality of client devices of a type of the client device. For example, a smartphone (which is mobile) may have more variation in requested bitrates than a television (which is relatively stationary). Thus, the number of the plurality of predicted bitrates can be more for a smartphone than for a television. Accordingly, when a smartphone requests a first set of segments at a first bitrate, the segment synthesis system can generate a prediction indicative of a predicted set encoding each of a second set of segments at five different bitrates, whereas when a television requests the first set of segments at the first bitrate, the segment synthesis system can generate a prediction indicative of a predicted set encoding each of the second set of segments at three different bitrates.

In some circumstances, the method 500 includes the segment synthesis system determining, at block 518, that at least one segment instance of the first predicted set is not stored in a non-transitory memory. In such circumstances, the method 500 includes the segment synthesis system synthesizing, at block 520, the at least one segment instance.

In some circumstances, the method 500 includes the segment synthesis system obtaining, at block 522, one or more segment instances of the first predicted set from the non-transitory memory. In various implementations, the method 500 can include the segment synthesis system obtaining (in block 522) segment instances of the first predicted set that are present in the non-transitory memory and synthesizing (in block 520) segment instances of the first predicted set that are not present in the non-transitory memory.

The method 500 continues, at block 524, with the segment synthesis system receiving, after the first segment request and from the client device, a second segment request. The second segment request include data indicative of a second set of segments of the media item and data indicative of a second bitrate. The second set of segments can be subsequent to the first set of segments (e.g., the next segment or segments). In various implementations, the second bitrate can be the same as the first bitrate or a different bitrate.

The method 500 continues, at block 526, with the segment synthesis system transmitting, to the client device, a second set of segment instances. Each of the second set of segment instances includes data encoding a respective one of the second set of segments at the second bitrate. In some implementations, a number of the second set of segments is less than a number of the first set of segments. For example, the first set of segments can include two segments and the second set of segments can include one segment. In some circumstances, the second set of segment instances is a subset of the first predicted set of segment instances. Thus, the segment synthesis system can transmit the second set of segment instances (in block 526) without having to synthesize any of the second set of segment instances after the second request is received.

The method 500 continues, at block 528, with the segment synthesis system generating, in response to the second segment request, a second prediction indicative of a second predicted set of segment instances. Each of the second predicted set of segment instances includes data encoding a segment of the media item subsequent to the second set of segments at one of a second plurality of predicted bitrates. In various implementations, the second plurality of predicted bitrates can be the same as the plurality of predicted bitrates or different from the plurality of predicted bitrates. In various implementations, a number of the second plurality of predicted bitrates can be the same as a number of the plurality of predicted bitrates or different from a number of the plurality of predicted bitrates.

In some implementations, the method 500 includes determining that the second set of segment instances includes an unexpected segment instance not included in the first predicted set of segment instances. In some implementations, the segment synthesis system can synthesize the unexpected segment instance so that it can be transmitted (in block 526). In such implementations, generating the prediction (at block 528) includes generating, in response to the second segment request and the determination that the second set of segment instances includes the unexpected segment instance, a second prediction indicative of a second predicted set of segment instances encoding a segment of the media item subsequent to the second set of segments at each of a plurality of supported bitrates (e.g., all of the supported bitrates).

The method 500 continues, at block 530, with the segment synthesis system determining a request frequency for each of a plurality of segment instances. The method 500 continues, at block 532, with the segment synthesis system determining a high-frequency set of the plurality of segment instances based on the request frequencies. The method 500 continues, at block 534, with the segment synthesis system obtaining the high-frequency set of the plurality of segment instances (either through synthesis or retrieval from the non-transitory memory). In various implementations, at least one segment instance of the high-frequency set is obtained prior to a segment request being received requesting the segment instance.

Figure 6:
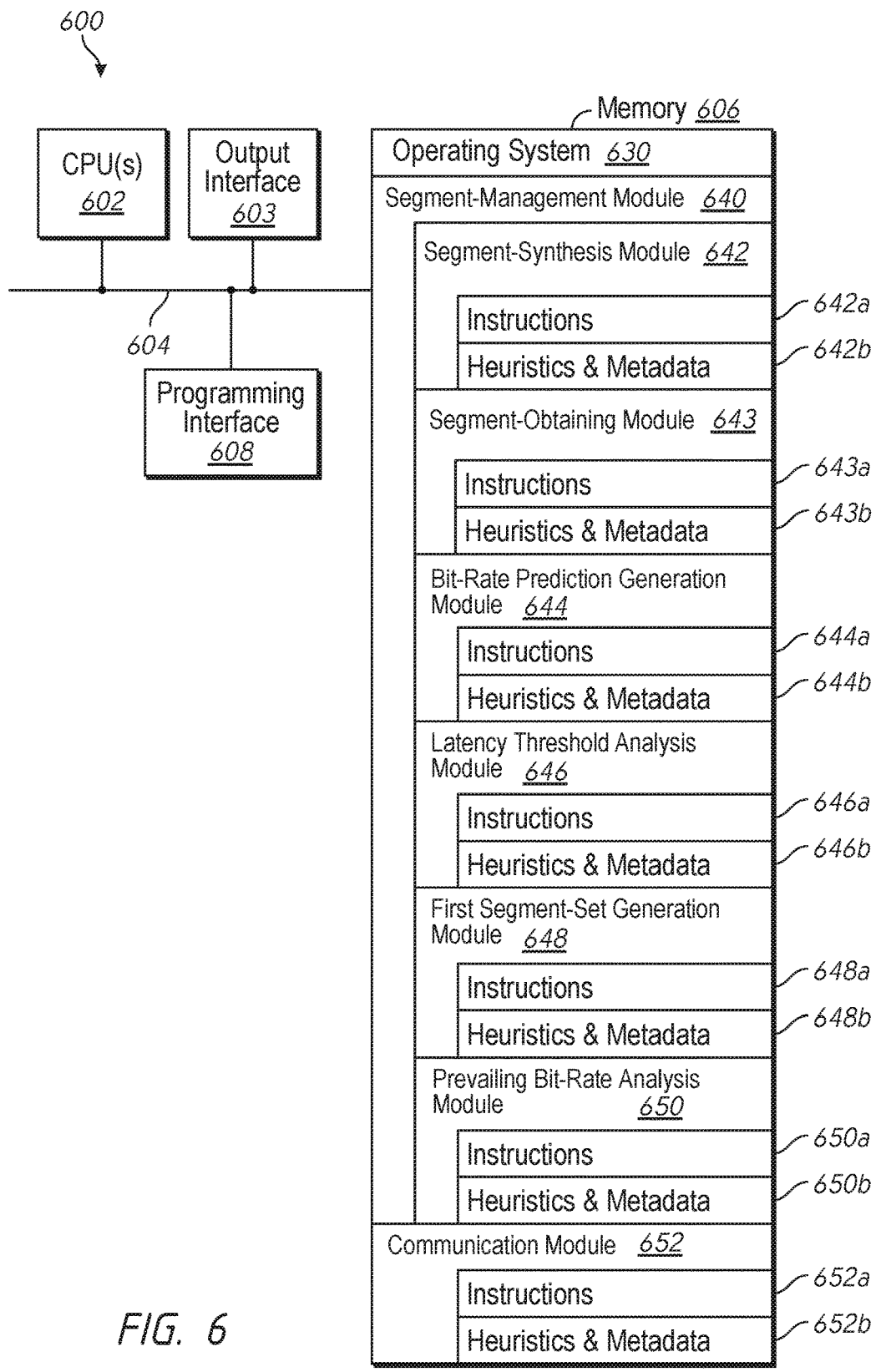
FIG. 6 is a block diagram of a computing device in accordance with some implementations.

FIG. 6 is a block diagram of a computing device 600 in accordance with some implementations. In some implementations, the computing device 600 corresponds to a segment synthesis system such as the storage synthesis system 110 of FIGS. 1A-1C and performs one or more of the functionalities described above with respect to a segment synthesis system. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units (CPU's) 602 (e.g., processors), one or more output interfaces 603 (e.g., a network interface), a memory 606, a programming interface 608, and one or more communication buses 604 for interconnecting these and various other components.

In some implementations, the communication buses 604 include circuitry that interconnects and controls communications between system components. The memory 606 includes high-speed random access memory, such as DRAM, SRAM, DDR RAM or other random access solid state memory devices and in some implementations, includes non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some implementations, the memory 606 or the non-transitory computer readable storage medium of the memory 606 stores the following programs, modules and data structures, or a subset thereof including an optional operating system 630 and a segment distribution module 640. In some implementations, one or more instructions are included in a combination of logic and non-transitory memory. The operating system 630 includes procedures for handling various basic system services and for performing hardware dependent tasks. In some implementations, the segment distribution module 640 is configured to response to requests for segments of a media item. To that end, the segment distribution module 640 includes a communications module 642 and a prediction module 644.

In some implementations, the communications module 642 is configured to receive, from a client device, a first segment request including data indicative of a first set of segments of the media item and data indicative of a first bitrate. The communications module 642 can be further configured to transmit, to the client device in response to the first segment request, a first set of segment instances, each of the first set of segment instances including data encoding a respective one of the first set of segments at the first bitrate. To that end, the communications module 642 includes a set of instructions 642a and heuristics and metadata 642b. In some implementations, the prediction module 644 is configured to generate, in response to the first segment request, a first prediction indicative of a first predicted set of segment instances, each of the first predicted set of segment instances including data encoding a segment of the media item subsequent to the first set of segments at one of a plurality of predicted bitrates. To that end, the prediction module 644 includes a set of instructions 644a and heuristics and metadata 644b.

Although the segment distribution module 640, the communications module 642, and the prediction module 644 are illustrated as residing on a single computing device 600, it should be understood that in other embodiments, any combination of the segment distribution module 640, the communications module 642, and the prediction module 644 can reside in separate computing devices in various implementations. For example, in some implementations each of the segment distribution module 640, the communications module 642, and the prediction module 644 reside on a separate computing device.

Moreover, FIG. 6 is intended more as a functional description of the various features that are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at a system configured to synthesize segment instances corresponding to segments of a media item including a series of segments, the system including a non-transitory memory and one or more processors:
   receiving, from a client device, a first segment request including data indicative of a first set of segments of the media item and data indicative of a first bitrate;
   transmitting, to the client device in response to the first segment request, a first set of segment instances, each of the first set of segment instances including data encoding a respective one of the first set of segments of the media item at the first bitrate;
   determining, in response to the first segment request, a plurality of predicted bitrates based at least in part on the first bitrate; and
   generating a first prediction indicative of a first predicted set of segment instances, each of the first predicted set of segment instances including data encoding a segment of the media item subsequent to the first set of segments of the media item at one of the plurality of predicted bitrates.

2. The method of claim 1, further comprising:
determining that at least one segment instance of the first predicted set is not stored in the non-transitory memory; and
synthesizing the at least one segment instance.

3. The method of claim 1, further comprising:
obtaining, from the non-transitory memory, one or more segments instances of the first predicted set.

4. The method of claim 1, wherein the plurality of predicted bitrates includes the first bitrate and a predicted bitrate that is different from the first bitrate.

5. The method of claim 1, wherein the plurality of predicted bitrates are further based on historical bitrate data for the client device or historical bitrate data for a plurality of client devices of a type of the client device.

6. The method of claim 1, further comprising:
receiving, from the client device after receiving the first segment request, a second segment request, wherein the second segment request includes data indicative of a second set of segments of the media item and data indicative of a second bitrate; and
transmitting, to the client device in response to the second segment request, a second set of segment instances, each of the second set of segment instances including data encoding a respective one of the second set of segments of the media item at the second bitrate.

7. The method of claim 6, wherein a number of second set of segments of the media item is less than a number of the first set of segments of the media item.

8. The method of claim 6, wherein the second set of segment instances is a subset of the first predicted set of segment instances.

9. The method of claim 6, further comprising:
generating, in response to the second segment request, a second prediction indicative of a second predicted set of segment instances, each of the second predicted set of segment instances including data encoding a segment of the media item subsequent to the second set of segments of the media item at one of a second plurality of predicted bitrates.

10. The method of claim 6, further comprising:
determining that the second set of segment instances includes an unexpected segment instance not included in first predicted set of segment instances, and
generating, in response to the second segment request and the determination that the second set of segment instances includes the unexpected segment instance, a second prediction indicative of a second predicted set of segment instances encoding a segment of the media item subsequent to the second set of segments of the media item at each of a plurality of supported bitrates.

11. The method of claim 1, further comprising:
synthesizing, prior to receiving the first segment request, an initial set of segment instances including a segment instance for each of the first set of segments of the media item encoded at each of a plurality of supported bitrates.

12. The method of claim 1, further comprising:
determining a latency threshold of the client device; and
determining a number of the first set of segments of the media item based in part on the latency threshold.

13. The method of claim 12, wherein obtaining the latency threshold of the client device includes:
transmitting, to the client device, a latency query message; and
receiving, from the client device, a latency response message including data indicative of the latency threshold.

14. The method of claim 1, further comprising:
determining a request frequency for each of a plurality of segment instances of the media item;
determining a high-frequency set of the plurality of segment instances based on the request frequencies; and
obtaining the high-frequency set of the plurality of segment instances.

15. A system configured to synthesize segment instances corresponding to segments of a media item including a series of segments, the system including a non-transitory memory and one or more processors, the system further comprising:
a communication module configured to:
receive, from a client device, a first segment request including data indicative of a first set of segments of the media item and data indicative of a first bitrate; and
transmit, to the client device in response to the first segment request, a first set of segment instances, each of the first set of segment instances including data encoding a respective one of the first set of segments of the media item at the first bitrate; and
a prediction module configured to:
determine, in response to the first segment request, a plurality of predicted bitrates based at least in part on the first bitrate; and
generate a first prediction indicative of a first predicted set of segment instances, each of the first predicted set of segment instances including data encoding a segment of the media item subsequent to the first set of segments of the media item at one of the plurality of predicted bitrates.

16. The system of claim 15, wherein the plurality of predicted bitrates includes the first bitrate and a predicted bitrate that is different from the first bitrate.

17. The system of claim 15, wherein the prediction module is further configured to, responsive to generating the first prediction:
determining that at least one segment instance of the first predicted set of segment instances is not stored in the non-transitory memory; and
synthesizing the at least one segment instance.

18. The system of claim 15, wherein the communications module is further configured to:
receive, from the client device after receiving the first segment request, a second segment request, wherein the second segment request includes data indicative of a second set of segments of the media item and data indicative of a second bitrate; and
transmit, to the client device in response to the second segment request, a second set of segment instances, each of the second set of segment instances including data encoding a respective one of the second set of segments of the media item at the second bitrate.

19. The system of claim 18, wherein the second set of segment instances is a subset of the first predicted set of segment instances and a number of second set of segments of the media item is less than a number of the first set of segments of the media item.

20. A device configured to synthesize segment instances corresponding to segments of a media item including a series of segments, the device including a non-transitory memory and one or more processors, the device further comprising:

one or more processors;

a non-transitory memory;

means for receiving, from a client device, a first segment request including data indicative of a first set of segments of the media item and data indicative of a first bitrate;

means for transmitting, to the client device in response to the first segment request, a first set of segment instances, each of the first set of segment instances including data encoding a respective one of the first set of segments of the media item at the first bitrate;

mean for determining, in response to the first segment request, a plurality of predicted bitrates based at least in part on the first bitrate; and means for generating a first prediction indicative of a first predicted set of segment instances, each of the first predicted set of segment instances including data encoding a segment of the media item subsequent to the first set of segments of the media item at one of the plurality of predicted bitrates.

* * * * *